United States Patent
Lombaert et al.

(10) Patent No.: US 10,112,335 B2
(45) Date of Patent: Oct. 30, 2018

(54) PROCESS FOR MANUFACTURING PANELS FOR FLOOR AND WALL COVERINGS

(71) Applicant: BerryAlloc NV, Menen (BE)

(72) Inventors: Pol Lombaert, Menen (BE); Matthias Wyseur, Menen (BE); Tim Vanderhaegen, Menen (BE)

(73) Assignee: BerryAlloc NV, Menen (BE)

( * ) Notice: Subject to any disclaimer, the term of this patent is extended or adjusted under 35 U.S.C. 154(b) by 102 days.

(21) Appl. No.: 15/309,254

(22) PCT Filed: May 7, 2015

(86) PCT No.: PCT/IB2015/053330
§ 371 (c)(1),
(2) Date: Nov. 7, 2016

(87) PCT Pub. No.: WO2016/001775
PCT Pub. Date: Jan. 7, 2016

(65) Prior Publication Data
US 2017/0106578 A1    Apr. 20, 2017

(30) Foreign Application Priority Data
May 7, 2014    (BE) .................. 2014/0328

(51) Int. Cl.
*B29C 47/00*    (2006.01)
*B32B 23/00*    (2006.01)
(Continued)

(52) U.S. Cl.
CPC ...... *B29C 47/0064* (2013.01); *B29C 47/0019* (2013.01); *B29C 47/0047* (2013.01);
(Continued)

(58) Field of Classification Search
CPC .............. B29C 47/0064; B29C 47/065; B29C 47/1081; B29C 47/14; B29C 47/40;
(Continued)

(56) References Cited

U.S. PATENT DOCUMENTS 4,788,088 A * 11/1988 Kohl .................. B29C 47/0038
428/34.5
4,915,764 A *  4/1990 Miani .................... B27N 1/00
156/244.19
(Continued)

FOREIGN PATENT DOCUMENTS

EP    0292584 A1    11/1988
EP    2182138 A1     5/2010

OTHER PUBLICATIONS

Anderson, Paul et al.; "Improving Twin-Screw Compounding of Reinforced Polyolefins"; Plastics Technology Online, Mar. 25, 2013, pp. 1-7, Cincinnati, OH; Retrieved from the Internet.

*Primary Examiner* — Michael Bernshteyn
(74) *Attorney, Agent, or Firm* — James C. Wray

(57) ABSTRACT

The present invention relates to a process for the production of a panel for floor or wad coverings comprising the steps of mixing and homogenising raw materials, thereby obtaining a dryblend, extruding said dryblend, thereby obtaining one or more thermoplastic layers, laminating the afore-mentioned thermoplastic layers, thereby obtaining a laminate, and profiling said laminate, thereby obtaining a panel for floor or wall coverings, wherein at least one thermoplastic layer is extruded by means of a co-rotating twin-screw extruder with pressure element.

16 Claims, 3 Drawing Sheets

(51) Int. Cl.

| | |
|---|---|
| *E04F 15/10* | (2006.01) |
| *B32B 37/18* | (2006.01) |
| *B29C 47/06* | (2006.01) |
| *B29C 47/14* | (2006.01) |
| *B32B 27/30* | (2006.01) |
| *B32B 37/15* | (2006.01) |
| *B32B 5/24* | (2006.01) |
| *B32B 27/12* | (2006.01) |
| *B32B 3/06* | (2006.01) |
| *B29C 47/02* | (2006.01) |
| *B29C 47/10* | (2006.01) |
| *B29C 47/40* | (2006.01) |
| *B29C 47/92* | (2006.01) |
| *B29C 47/88* | (2006.01) |
| *B32B 38/00* | (2006.01) |
| *B29C 47/78* | (2006.01) |
| *B29K 27/06* | (2006.01) |
| *B29K 101/12* | (2006.01) |
| *B29K 105/16* | (2006.01) |
| *B29K 309/08* | (2006.01) |
| *B29L 7/00* | (2006.01) |
| *B29L 9/00* | (2006.01) |

(52) U.S. Cl.
CPC .......... *B29C 47/025* (2013.01); *B29C 47/065* (2013.01); *B29C 47/1045* (2013.01); *B29C 47/1081* (2013.01); *B29C 47/14* (2013.01); *B29C 47/40* (2013.01); *B29C 47/402* (2013.01); *B29C 47/786* (2013.01); *B29C 47/884* (2013.01); *B29C 47/92* (2013.01); *B32B 3/06* (2013.01); *B32B 5/245* (2013.01); *B32B 27/12* (2013.01); *B32B 27/304* (2013.01); *B32B 37/153* (2013.01); *B32B 37/182* (2013.01); *B32B 38/0036* (2013.01); *B29C 2947/92514* (2013.01); *B29C 2947/92704* (2013.01); *B29K 2027/06* (2013.01); *B29K 2101/12* (2013.01); *B29K 2105/16* (2013.01); *B29K 2309/08* (2013.01); *B29L 2007/002* (2013.01); *B29L 2009/00* (2013.01); *B32B 2038/0048* (2013.01); *B32B 2260/023* (2013.01); *B32B 2260/046* (2013.01); *B32B 2262/101* (2013.01); *B32B 2266/0235* (2013.01); *B32B 2266/08* (2013.01); *B32B 2272/00* (2013.01); *B32B 2307/40* (2013.01); *B32B 2307/412* (2013.01); *B32B 2307/414* (2013.01); *B32B 2307/554* (2013.01); *B32B 2307/7265* (2013.01); *B32B 2307/734* (2013.01); *B32B 2309/02* (2013.01); *B32B 2309/10* (2013.01); *B32B 2309/125* (2013.01); *B32B 2419/04* (2013.01); *B32B 2471/00* (2013.01); *B32B 2607/00* (2013.01); *E04F 15/105* (2013.01); *E04F 15/107* (2013.01)

(58) Field of Classification Search
CPC ......... B29C 47/884; B32B 3/06; B32B 27/12; B32B 27/304; B32B 27/182; B32B 38/0036; B32B 2038/0048; B32B 2260/046; B32B 2262/101; B32B 2307/412; B32B 2307/414; B32B 2307/554; B32B 2607/00; B29K 2101/12; B29K 2105/16; B29K 2027/06
USPC ...................................... 428/411.1
See application file for complete search history.

(56) References Cited

U.S. PATENT DOCUMENTS

| | | | |
|---|---|---|---|
| 7,318,720 | B2 | 1/2008 | Pabedinskas |
| 2002/0165289 | A1* | 11/2002 | Park .................. B27N 1/00 521/82 |
| 2005/0003221 | A1* | 1/2005 | Walrath ............. B29C 47/0019 428/522 |
| 2010/0159213 | A1* | 6/2010 | Przybylinski .......... B32B 27/04 428/195.1 |

\* cited by examiner

PROCESS FOR MANUFACTURING PANELS FOR FLOOR AND WALL COVERINGS This application claims the benefit of Belgian Application No. BE2014/03028 filed May 7, 2014, and PCT/IB2015/053330 filed May 7, 2015, International Publication No. WO 2016/001775 A1, which are hereby incorporated by reference in their entirety as if fully set forth herein.

TECHNICAL FIELD

The present invention relates to a process for manufacturing panels for floor or wall coverings. In particular, the invention relates to a specific manner for extruding a thermoplastic mixture for forming one or more thermoplastic layers of a laminate tile. The invention further relates to laminate tile for floor or wall coverings.

BACKGROUND

Manufacturing panels for floor or wall coverings is a very delicate process wherein, next to materials choice and quality of the raw materials, optimum operating parameters determine the good quality of the laminate panels. Such panels are desirable for wall and floor coverings in both domestic and industrial environment. Important properties of said panels are, inter alia, dimensional stability, flexural stiffness, resistance to curling and water resistance. Depending on the specific application of the panels, however, the properties need to be optimized. This optimization can be done by selecting the appropriate extrusion parameters, as well as by the reduction of material and energy losses. The suitable set-up of screws and dies is of fundamental importance.

For example, U.S. Pat. No. 7,318,720 discloses an improved die assembly for the extrusion of thermoplastic resin comprising cellulose-fibre composite profiles, wherein the die assembly is selected in such a way so as to minimize the risk of melt fracture at the surface of the extruded composite profile. The die assembly according to the invention comprises a balanced flow passage having a heated compression zone, a heated transition zone, a heated converging die zone and a die which corresponds to at least a portion of the downstream end of the flow passage and which is cooled to the temperature below the melting point of the thermoplastic resin.

The invention also discloses a production process for composite profiles comprising the steps of providing resin and fibre, thereby providing a composite compound, processing the compound through an extrusion system, extruding the compound through the die assembly to form the desired profile, cooling the profile, and cutting it to length.

Such optimized die assemblies are very specific depending on the implementation. For the use of extruders for producing panels for floor or wall panels, parameters such as mixing capacity and flow rate are of the highest importance. This means that a highly homogenized extruded mass must be ensured without an all too high risk of process interruptions as a result of, for example, melt fracture, and which can preferably be produced at sufficiently high flow rates. The reduction of unnecessary energy and material losses should also be taken into account. However, the prior art does not or does not adequately provide a solution to one or more of the afore-mentioned problems.

SUMMARY

To this aim, the invention provides in a first aspect a process for the production of a panel for wall or floor coverings comprising the steps of (i) mixing and homogenising raw materials, thereby obtaining a dryblend, (ii) extruding said dryblend, thereby obtaining one or more thermoplastic layers, (iii) laminating the afore-mentioned thermoplastic layers, thereby obtaining a laminate, and (iv) profiling said laminate, thereby obtaining a panel for floor or wall coverings, wherein at least one thermoplastic layer is extruded by means of a co-rotating twin-screw extruder with pressure element.

This offers the advantage that said panels can be produced in a manner wherein said raw materials do not have to be compounded beforehand with a thermoplastic material, but wherein filler and optionally additives can be homogenised with the thermoplastic material during extrusion. Avoiding a prior compounding step is on the one hand, energy-efficient, but also avoids the thermal degradation of the polymer chains of the thermoplastic. The latter contributes in turn to a better quality of the obtained panels and/or the choice of raw materials of lower qualification.

In a second aspect, the present invention provides a panel for wall or floor coverings obtained by a process according to the first aspect of the invention.

In a third aspect, the present invention provides a use of a process according to the first aspect of the invention for manufacturing panels for floor or wall coverings.

DETAILED DESCRIPTION OF THE FIGURES

The explicit characteristics, advantages and objectives of the present invention will further become clear to the skilled person in the technical field of the invention after reading the following detailed description of the embodiment of the invention and of the figures enclosed herein. The figures serve the purpose to further illustrate the invention, without thereby limiting the scope of the invention.

FIGS. 1 to 5 represent, respectively, a simplified representation of a process according to the first aspect of the present invention and a panel according to the second aspect of the present invention.

FIG. 1 is a schematic representation of a process according to the first aspect of the invention for the production of panels for wall or floor coverings comprising the steps of (S1) mixing and homogenising raw materials, thereby obtaining a dryblend, (S2) extruding said dryblend, thereby obtaining one or more thermoplastic layers, (S3), laminating the afore-mentioned thermoplastic layers, thereby obtaining a laminate, and (S4) profiling said laminate, thereby obtaining a panel for floor or wall coverings.

FIG. 2 is a schematic representation of a process according to the first aspect of the invention, with indication of (S2.1) feeding a dryblend to a co-rotating twin-screw extruder, (S2.2) mixing and/or kneading a thermoplastic material in said twin-screw extruder, (S2.3) feeding a composition with a high filler content, comprising an increased content of filler and mixing it with the afore-mentioned dryblend at a position downstream in said twin-screw extruder, and (S2.4) increasing the pressure in said twin-screw extruder by means of a pressure element.

DETAILED DESCRIPTION OF THE INVENTION

Figure 1:
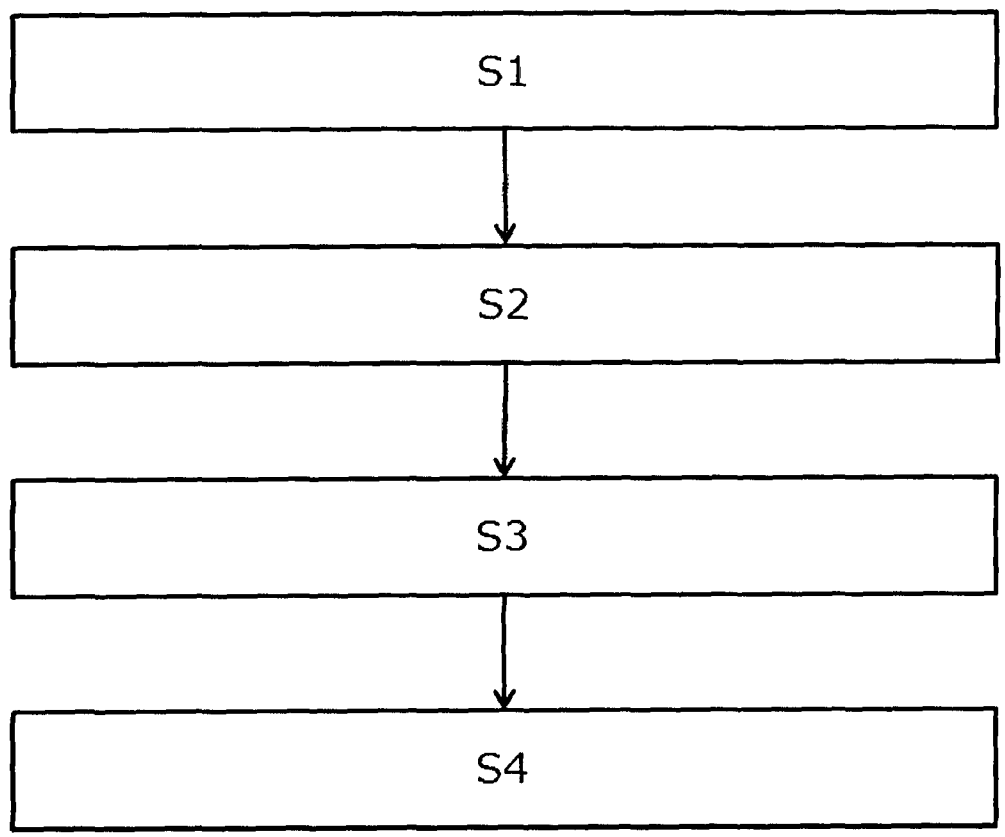

Unless defined otherwise, all terms used in the description of the invention, including technical and scientific terms, have the meaning as is commonly understood by the skilled person in the technical field of the invention. For a better assessment of the description of the invention, the following terms are explained explicitly.

"A", "an" and "the" refer in this document to both the singular and the plural, unless the context clearly implies otherwise. For example, "a segment" means one or more than one segment.

When "around" or "about" is used in this document with a measurable quantity, a parameter, a time period or moment in time, and the like, then variations are meant of +/−20% or less, preferably +/−10% or less, more preferably +/−5% or less, even more preferably +/−1% or less, and even more preferably +/−0.1% or less than and of the cited value, to the extent that such variations apply in the described invention. It should, however, be understood that the value of the quantity in which the term "around" or "about" is used, is itself specifically disclosed.

The terms "comprise", "comprising", "consist of", "consisting of", "provided with", "include" "including", "contain", "containing", "encompass", "encompassing" are synonyms and are inclusive or open terms that indicate the presence of what follows, and which do not exclude or prevent the presence of other components, features, elements, members, steps, known from or described in the prior art.

Quoting numerical intervals by endpoints comprises all integers, fractions and/or real numbers between the endpoints, these endpoints included.

The term "co-rotating twin-screw extruder" indicates an extruder with two kneading screws which rotate in the same direction. Such extruders provide a good kneading and mixing effect, but are, to a lesser extent, suitable for building up pressure for the extrusion through a die. In contrast to said co-rotating twin-screw extruder, a counter-rotating twin-screw extruder provides a good pressure build-up in the extruder—up to pressures of 50 to 250 bar—, however, without an adequate kneading effect.

The term "dryblend" is to be understood as a mixture of raw materials, wherein said raw materials are selected from the group comprising thermoplastic, plasticizers, fillers and additives, and wherein said mixture essentially comprises no water. Preferably, said mixture comprises less than 10000 ppm of water and more preferably less than 5000 ppm of water. Most preferably, said mixture comprises between 2500 ppm and 3000 ppm. It goes without saying that lower water contents are desirable, yet since the drying process is generally energy intensive, it is acceptable to operate with the afore-mentioned water contents without thereby negatively affecting the quality of the obtained panels.

The term "pressure element" is to be understood as a device suitable for applying a pressure to a thermoplastic melt, wherein the applied pressure may preferably be situated in the range of 50 bar to 250 bar. Such pressure elements are known to the skilled person in the technical field of extrusion, and comprise, for example, a melt pump, a single-screw extruder, and/or a counter-rotating twin-screw extruder. Preferably, a melt pump and/or a single-screw extruder is used, because of its simple set-up and as a result, a relatively smaller risk of process interruptions. Most preferably, a melt pump is used.

In a first aspect, the invention provides a process for the production of a panel for floor or wall coverings comprising the steps of (i) mixing and homogenising raw materials, thereby obtaining a dryblend, (ii) extruding said dryblend, thereby obtaining one or more thermoplastic layers, (iii) laminating the afore-mentioned thermoplastic layers, thereby obtaining a laminate, and (iv) profiling said laminate, thereby obtaining a panel for floor or wall coverings, wherein at least one thermoplastic layer is extruded by means of a co-rotating twin-screw extruder with pressure element.

More specifically, said pressure element is provided in series and downstream with respect to said co-rotating twin-screw extruder. This offers the advantage that a good and optimum mixing of said dryblend is achieved in said co-rotating twin-screw, while a sufficiently high pressure for extrusion of the thermoplastic melt through the die is achieved by said pressure element. In this, said pressure element is preferably connected in series and after said double-screw. In addition, it appears that an additional, more specific, prior compounding step for the intensive mixing of the thermoplastic dryblend is no longer necessary, and that higher flow rates are possible. According to a process according to the invention, flow rates of thermoplastic material higher than 2000 kg per hour are possible, while for counter-rotating twin screw extruders, this is generally limited to 1500 kg per hour. Moreover, the process according to the invention makes it possible to extrude flow rates between 2000 kg per hour and 15000 kg per hour. However, according to a more preferred embodiment, the skilled person in the field of laminate panels will appreciate that flow rates between 5000 kg per hour and 8000kg per hour can be achieved.

Figure 2:
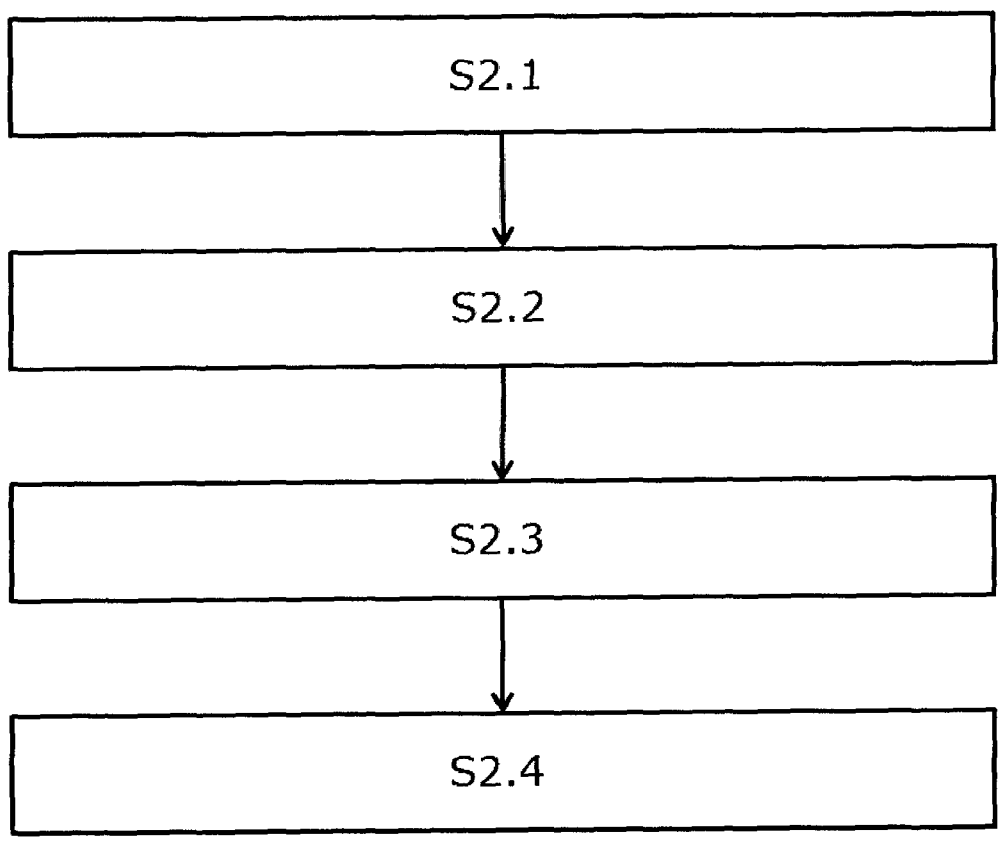

A process according to the invention is schematically represented with reference to FIGS. 1 and 2. FIG. 1 is a schematic representation of a process according to the first aspect of the invention for the production of panels for floor or wall coverings comprising the steps of (S1) mixing and homogenising raw materials, thereby obtaining a dryblend, (S2) extruding said dryblend, thereby obtaining one or more thermoplastic layers, (S3) laminating the afore-mentioned thermoplastic layers, thereby obtaining a laminate, and (S4) profiling said laminate, thereby obtaining a panel for floor or wall coverings. FIG. 2 is a schematic representation of a process according to the first aspect of the invention with indication of (S2.1) feeding a dryblend to a co-rotating twin-screw extruder, (S2.2), mixing and/or kneading a thermoplastic material in said twin-screw extruder, (S2.3) feeding a composition with a high filler content comprising an increased content of filler and mixing it with the afore-mentioned dryblend at a position downstream in said twin-screw extruder, and (S2.4) increasing the pressure in said twin-screw extruder by means of a pressure element.

In a preferred embodiment, the present invention provides a process according to the first aspect of the invention, wherein at least one thermoplastic layer is extruded with a die wherein the die opening has a length and a width, and wherein the ratio of said length with respect to the afore-mentioned width is between 100:1 and 5000:1. Preferably, said ratio is between 2000:1 and 200:1, and more preferably between 1000:1 and 250:1. Most preferably, said ratio is about 400:1. This offers the advantage that a plate-shaped extruded mass can be obtained, which, for example, can be subjected to an elongation and/or impregnation process in order to subsequently be laminated.

In a preferred embodiment, the present invention provides a process according to the first aspect of the invention, wherein said pressure element provides a pressure of 50 bar to 250 bar. Preferably, said pressure element provides a pressure between 100 bar and 200 bar. This offers the advantage that the pressure required to overcome the pressure drop can be provided during the extrusion through the die.

In a preferred embodiment, the present invention provides a process according to the first aspect of the invention, wherein said dryblend, after homogenisation, is stored in an insulated buffer tank and by means of feeders, is fed to said double-screw extruder at a temperature higher than 40° C.

By this is meant that the temperature after homogenising does not drop to a temperature lower than 40° C., more preferably not lower than 60° C., even more preferably that said temperature is maintained to a temperature situated between 75° C. and 80° C.

In a preferred embodiment, the present invention provides a process according to the first aspect of the invention, wherein said twin-screw extruder has a first and a second supply opening, wherein said second supply opening is provided at a distance located downstream of said first supply opening and wherein along said second supply opening, a composition with a high filler content is supplied. Such supply opening is known in the art as "side feeder". The term "composition with a high filler content" should in the context of the present invention be understood as comprising fillers and additives, and more preferably only fillers. In a more preferred embodiment, said extruder is fed via said second supply opening with filler. In an even more preferred embodiment, a composition with a high filler content is further added via a third, fourth and/or fifth supply opening for the further increase of the filler content in the extruded mass.

In a preferred embodiment, the present invention provides a process according to the first aspect of the invention, wherein ratio between the mass of the filler in said composition with a high filler content and the mass of the filler in the afore-mentioned dryblend is greater than 2:1, and preferably greater than 5:1. Even more preferably, said ratio is greater than 9:1. In an advantageous embodiment, no filler is incorporated in said dryblend, and said filler is mixed with said dryblend in said co-rotating twin-screw extruder. This offers the advantage that a larger amount of filler can be incorporated and homogenised in the polymer matrix, to a % by weight of filler relative to the total mass of the polymer matrix higher than 50% by weight, more preferably higher than 60% by weight, and most preferably between 60% by weight and 70% by weight. Most preferably, the extruded mass comprises 62% by weight, 64% by weight, 66% by weight, 68% by weight or 70% by weight of filler, or any value therein between.

In a preferred embodiment, the present invention provides a process according to the first aspect of the invention, wherein one or more thermoplastic layers are provided with a reinforcement layer, for example by means of coating of said thermoplastic layer onto a reinforcement layer.

In a more preferred embodiment, said thermoplastic layers comprise one or more reinforcement layers. Said reinforcement layers are intended to improve the stiffness, and then mainly the flexural stiffness of said panels. Preferably, at least one reinforcement layer is situated predominantly in the lower half of the panel obtained by the invention and at least one reinforcement layer is situated predominantly in the upper half of said panel. This offers the advantage that the tendency to bend or curve is suppressed as much as possible. Such a tendency can especially arise or occur in temperature fluctuations and then especially at elevated temperatures.

In a preferred embodiment, said reinforcement layers comprise glass fibres. In a more preferred embodiment, said glass fibres are comprised in a glass fibre fleece and/or in a glass fibre cloth. Preferably, said glass fibres are comprised in a glass fibre fleece, for example a nonwoven. Such nonwoven glass fibres appear to have a better embedding in the thermoplastic matrix, thereby obtaining a stronger and more rigid layer.

In a more preferred embodiment, said glass fibre is pre-treated with an adhesion additive which is intended to improve the adhesion between said glass fibres and said thermoplastic matrix. For example, said glass fibres are impregnated beforehand with the aid of a thermoplastic material, such as, for example, extruded granulate.

In a preferred embodiment, at least said substrate layer and/or at least said top layer comprise additionally individual reinforcing fibres, wherein said individual reinforcing fibres are not laterally interconnected in a network, but are dispersed loosely in a plastic matrix. Preferably, said reinforcing fibres have a length of at least 0.8 mm, and more preferably at least 1.0 mm. Such reinforcing fibres and/or reinforcement layers are intended to contribute to the dimensional stability of the panels obtained according to the method of the invention, which stability is especially desirable against expansion and contraction.

Preferably, said reinforcing fibres are spread out in said one or more thermoplastic layers, whether or not in the form of a glass fibre cloth and/or a glass fibre fleece.

In a more preferred embodiment, said individual reinforcing fibres have an average length of at least 3.0 mm, and preferably an average length of at least 4.5 mm. Preferably, said length is at most 20.0 mm, more preferably at most 12.0 mm, and still more preferably at most 9.0 mm. Preferably, said reinforcing fibres are comprised in said thermoplastic layers in a quantity of between 1 and 25% by weight, and more preferably between 5 and 15% by weight, relative with respect to the total weight of, said reinforcing fibres and thermoplastic layers. Still preferably, said fibres correspond to the description according to the DIN 1259 standard. In a first embodiment, said reinforcing fibres comprise glass fibres, however, in an alternative embodiment, steel fibres, carbon fibres, aramid fibres, polyethylene fibres and/or polypropylene fibres may also be used. In yet an alternative embodiment, fibres from biological origin are used, such as for example, but not limited to, flax fibre, bamboo fibre, wood fibre, rice fibre. Said reinforcing fibres preferably have an average diameter ranging between 1 μm and 100 μm, yet more preferably ranging between 3 μm and 30 μm. Most preferably, said average diameter ranges between 5 μm and 25 μm. In a further preferred embodiment, said reinforcing fibres are pre-treated with an additive or coating for improving the adhesion between said reinforcing fibres and said thermoplastic layers, for example, but not limited to, silane. In a further preferred embodiment, reinforcing fibres are selected having a thermal expansion coefficient smaller than the thermal expansion coefficient of said thermoplastic layers in which said fibres are incorporated and/or with a Young's modulus which is preferably greater than the modulus of said thermoplastic layers, and preferably greater than 40 GPa, and more preferably greater than 60 GPa. In an additional preferred embodiment, said invention provides a panel with reinforcing fibres having a thermal expansion coefficient of less than 30 μm/m.K, and more preferably less than 5 μm/m.K. In a preferred embodiment, said glass fibres have a length of 1 mm or more, and preferably a length of 3 mm or more. In a preferred embodiment, said glass fibres have a diameter situated between 5 and 25 μm.

In a preferred embodiment, the present invention provides a process according to the first aspect of the invention, wherein said reinforcement layer is impregnated with a thermoplastic at a temperature higher than 120° C. In a more preferred embodiment, said reinforcement layer is impregnated with a thermoplastic at a temperature higher than 150° C., and more preferably at a temperature between 160° C. and 200° C. This offers the advantage that a good contact, and thus a good adhesion, is achieved between the reinforcement layer on the one hand and on the other hand, the thermoplastic matrix.

In a preferred embodiment, the present invention provides a process according to the first aspect of the invention, wherein at least one thermoplastic layer, after leaving said die, is cooled to a temperature higher than 75° C. and is laminated between a thermoplastic layer and a multifunctional layer comprising a wear layer, a print layer and a decor layer. This offers the advantage that no or significantly less heat has to be supplied to the process for heating the thermoplastic extruded mass during lamination to the appropriate laminating temperature.

In a more preferred embodiment, said at least one thermoplastic layer, after leaving said die, is cooled to a temperature higher than 100° C. and preferably to a temperature higher than 120° C. More preferably, said thermoplastic layer is cooled to a temperature higher than 140° C. Most preferably, said temperature ranges between 150° C. and 160° C., and is preferably equal to 151° C., 152° C., 153° C., 154° C., 155° C., 156° C., 157° C., 158° C., 159° C., 160° C., or any temperature therein between.

In a preferred embodiment, the present invention provides a process according to the first aspect of the invention, wherein after the lamination of multiple thermoplastic layers, the upper layer is heated, preferably by means of infrared heating, and wherein subsequently a relief is applied onto said upper layer. However, in a more preferred embodiment, said relief is applied while said upper layer, right after lamination, yet is still sufficiently warm, this is a temperature of at least 75° C. and more preferably at least 130° C., and even more preferably at least 150° C. Thus, the extrusion heat can be utilized for applying a relief and no additional heating of said upper layer is required. This offers an important energetic advantage. In a more preferred embodiment, said relief is thus applied, so that the relief has a depth of at least 0.05 mm and preferably at least 0.1 mm. In an even more preferred embodiment, said relief is provided with a depth of at most 0.4 mm and preferably ranging between 0.1 mm and 0.3 mm. Most preferably, said relief has a depth of about 0.2 mm.

In a preferred embodiment, the present invention provides a process according to the first aspect of the invention, wherein recycled material is mixed and homogenised with the afore-mentioned dryblend. The term "recycled material" is indicated to both extrusion waste produced during the production process and plastic waste such as, for example, but not limited to, residues of window profiles. Depending on the type of recycled material, additionally, additives may be added to said dryblend to obtain better properties, such as, inter alia, good stiffness and impact resistance. This offers the advantage that the waste production of the process is reduced, and that materials and raw materials are utilised to the maximum.

In a second aspect, the present invention provides a panel for floor or wall coverings obtained by a process according to the first aspect of the invention.

In a preferred embodiment, the present invention provides a panel according to the second aspect of the invention, comprising a back-pull layer, a substrate layer, a decor layer or print layer, a wear layer and optionally a coating layer.

In a more preferred embodiment, said panel according to the invention comprises essentially a top layer and a substrate layer, wherein said layers enclose a reinforcement layer. Preferably, said panel is comprised out of the afore-mentioned layers for more than 75% by weight, and more preferably for more than 90% by weight.

In a preferred embodiment, said substrate layer has a thickness comprised between 0.5 mm and 8.0 mm, and more preferably between 1.0 mm and 4.5 mm. Even more preferably, said panel is comprised out of said substrate layer for at least 50% by weight, and more preferably for at least 60% by weight.

In a preferred embodiment, the present invention provides a panel according to the second aspect of the invention, wherein said substrate layer comprises a PVC foam.

In a more preferred embodiment, said substrate layer comprises a closed cell and/or partly open cell PVC foam having a density of between 200 kg/m$^3$ and 2500 kg/m$^3$, and more preferably between 600 kg/m$^3$ and 2000 kg/m$^3$. Most preferably, said density is comprised between 800 kg/m$^3$ and 1600 kg/m$^3$. Such panels provide a good rigidity, stiffness and dimensional stability, as well as a good water-resistance, and improved acoustic and/or thermal insulating properties. Preferably, the afore-mentioned relates to foamed PVC sheet, or a foamed plastic sheet which consists essentially of another vinyl compound, such as polyvinyl dichloride, polyvinyl butyrate, polyvinyl acetate and the like. As an alternative, melamine foam, polyurethane or polyisocyanurate can also be used as the basic material for the substrate. As mentioned above as well, an average density of the plastic sheet of about 1200 kilograms per cubic meter leads to an optimal result of all the beneficial and adverse effects. For example, a lower density provides a lower material consumption and a lower weight, which is advantageous during transport and installation; however, exhibiting a lower stiffness, a less desirable acoustic, insulating properties and a high residual indentation. Preferably, said residual indentation is less than 0.5 mm, measured according to EN ISO 24343 or ASTM F 1914. More preferably, said residual indentation is less than 0.2 mm and even more preferably less than 0.1 mm. This can be obtained by providing a sufficiently low density and a lower content of plasticizer. Such density can be achieved by means of plastic materials of the closed cell type, this in contrast to the common hard foams of the open-cell type, for example, polyester hard foams.

In an optional embodiment, said panel according to the invention is further provided with a balance layer or back-pull layer, which is intended as a counter weight or balance for said top layer. Such balance layer typically comprises a thermoplastic plastic layer, and typically has a thickness and weight of approximately equal to said top layer, yet preferably is slightly thinner and lighter. However, preferably such balance layer is not present in the preferred embodiment of the panel according to the invention. Thus, afore-mentioned substrate layer in such an embodiment also forms the bottom layer of said panel without further protective layer.

In a more preferred embodiment, said panel according to the invention comprises a top layer with a printed decor, and a protective layer or wear layer provided above that. Said printed decor or decor layer with print layer may consist of a printed plastic film with a thickness ranging between 0.1 mm and 1.0 mm and may be made of PVC film, PU film, PP film, or PET film, but is preferably made of PVC film. Preferably, said PVC film is a hard PVC film with a low content of plasticizers, by this, it is meant that the plasticizer content in said PVC is lower than 15% by weight, and preferably lower than 5% by weight. Most preferably, said PVC film does not comprise plasticizers. Even more preferably, a PVC film is used with a K-value comprised between 50 and 80, and more preferably, a K-value between 60 and 75. This offers the advantage of a hard PVC layer which can be printed very accurately. In addition, the drying process after the printing with water-based inks is very simply by means of the necessary heat supply to said decor layer. In an optional embodiment, said top layer may additionally comprise a UV surface coating, for example, to improve the gloss, but also the resistance to staining.

In a preferred embodiment, the present invention provides a panel according to the second aspect of the invention, wherein at least one of the said thermoplastic layers comprise polyvinyl chloride (PVC).

Preferably, said wear layer is a translucent or transparent layer through which the aspect of the underlying decor is visible. Such transparent layer can be easily obtained by means of extrusion, coating and/or calendering of a thermoplastic material. A suitable material choice can be made by selection from a group comprising PVC, PU, PP or PET, but preferably PVC. Even more preferably, a PVC is used for said wear layer with a K-value comprised between 60 and 95 and more preferably a K-value between 70 and 85. Optionally, additives can be added for enhancing the wear resistance, yet this does not appear to be necessary for a proper execution in order to maintain a sufficient wear resistance. A sufficient wear resistance can be understood as a panel from class AC2 or AC3, measured according to EN 660 and/or EN 13329. Preferably, said wear layer has a thickness of at least 0.10 mm and more preferably at least 0.25 mm. Preferably, said thickness is less than 1.0 mm and more preferably less than 0.50 mm. Most preferably, said wear layer has a thickness comprised between 0.30 mm and 0.40mm. Such wear layers are found to have a sufficient wear resistance, and succeed in Taber tests with an IP value of 2000 or more, measured according to EN 13329.In a most preferred embodiment, the present invention provides a panel according to the first aspect of the invention, wherein said transparent wear layer comprises PVC.

Figure 3:
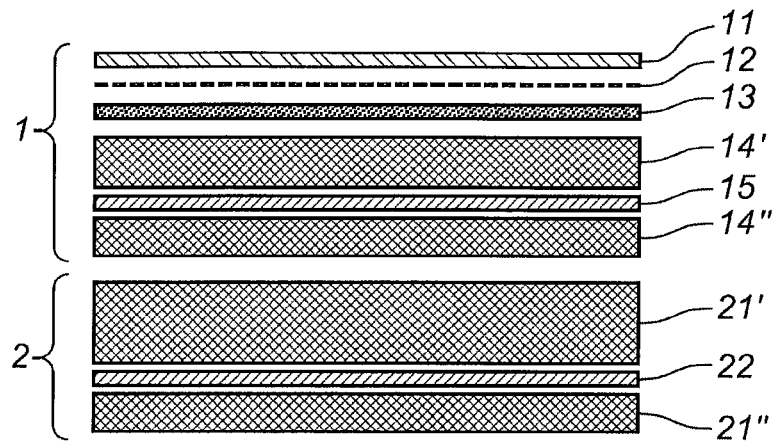
FIG. 3 is a schematic representation of a panel according to the invention with indication of a top layer (1) comprising a wear layer (11), a print layer (12), a decor layer (13), a first thermoplastic layer (14', 14") with a reinforcement layer (15); and a substrate layer (2) comprising a second thermoplastic layer (21', 21") with a reinforcement layer (22).

FIG. 3 is a schematic representation of a panel according to the invention with indication of a top layer (1) comprising a wear layer (11), a print layer (12), a decor layer (13), a first thermoplastic layer (14', 14") with a reinforcement layer (15); and a substrate layer (2) comprising a second thermoplastic layer (21', 21") with a reinforcement layer (22).

In an optional embodiment, said panel according to the invention is further provided with a protective lacquer layer or coating layer. Such lacquer layer may for instance be implemented as a PU layer and/or a curing lacquer layer, such as, for example, but not limited to a UV or an electron beam curing lacquer layer.

In a preferred embodiment of a panel according to the first aspect of the invention, said panel provides at least at two mutually opposite edges, and preferably at four mutually opposite edges, connection means or attachment means for laterally connecting two panels next to one another and substantially in the same plane. Preferably, said connection means relate to mechanical connection means for a locking or fixation of both constituting panels, both in the vertical direction, this is the direction perpendicular to the plane of said constituting panels, and in the horizontal direction, this is the direction in the plane of said constituting panels.

In a preferred embodiment, the present invention provides a panel according to the second aspect of the invention, wherein said panel provides said mechanical connection means in an embodiment comprising a lateral protrusion and recess, respectively, wherein said protrusion and recess essentially correspond with one another with regard to form, yet in the connected state, is provided with possible open spaces in the longitudinal direction of said edges, wherein said open spaces are intended to build up a well-defined flexural tension in said lateral protrusion during the connecting in order to thus secondarily fix said constituting panels with respect to one another.

In a preferred embodiment, the present invention provides a panel according to the second aspect of the invention, wherein said panel provides said mechanical connection means, as described in the preceding paragraph, wherein said lateral protrusion is further equipped with a secondary, transverse protrusion and wherein said lateral recess is further equipped with a secondary, transverse recess, in a way that both constituting panels, when positioned in the connected state relative to one another, afore-mentioned secondary, transverse protrusion and said secondary, transverse recess overlap and thus ensure a mechanical anchoring of both afore-mentioned constituting panels in the secondary direction, this is the direction in the plane of afore-mentioned panels, yet perpendicular to the longitudinal direction of said edges.

In a preferred embodiment, the present invention provides a panel according to the second aspect of the invention, wherein said mechanical connection means are further provided in an embodiment suitable for the corresponding connection of the constituting connection parts, as is known for example from, but not limited to, WO 94/26999 or EP 1 026 341. Such corresponding connection can, for example, be built up by the application of a curvature in afore-mentioned lateral protrusion. Preferably, said lateral protrusion is implemented in such way that both constituting connection parts are composed by sliding said constituting panels towards one another in the horizontal direction, this is the direction in the plane of afore-mentioned constituting panels.

In a preferred embodiment, the present invention provides a panel according to the second aspect of the invention, wherein said connection means were obtained by means of a milling operation at the edges of said constituting panels.

Figure 4:
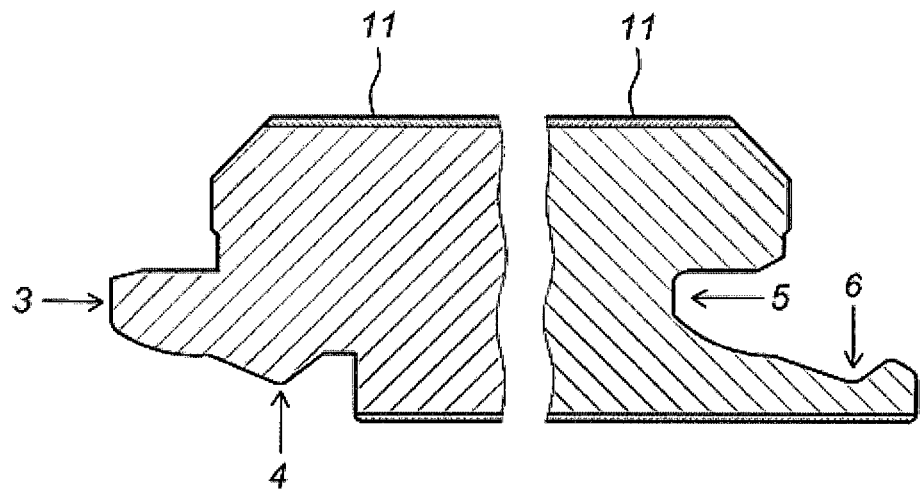
FIG. 4 is a schematic representation of the cross-section of a panel according to the invention with indication of connection means which are provided along the edges of said panel.
Figure 5:
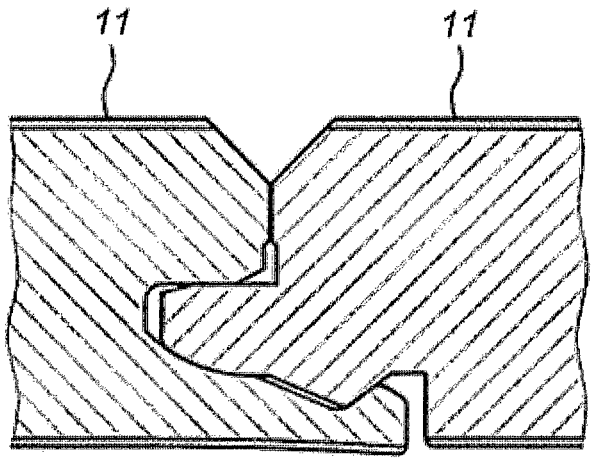
FIG. 5 is a schematic detail representation of connection means of panels connected laterally in connected state.

FIG. 4 is a schematic representation of the cross-section of a panel according to the invention with indication of connection means which are provided along the edges of said panel. In FIG. 4, the lateral protrusion (3) was also equipped with a secondary, transverse protrusion (4). In an analogous manner, the lateral recess (5) is further equipped with a secondary, transverse recess (6). FIG. 5 is a schematic detail representation of connection means of panels connected laterally in the connected state.

In a preferred embodiment, the present invention provides a panel according to the second aspect of the invention, wherein said connection means are substantially comprised in the afore-mentioned substrate layer, wherein said substrate layer preferably comprises said at least one reinforcement layer. More preferably, the afore-mentioned connection means are provided in said panel in such way, so that said at least one reinforcement layer is comprised in afore-mentioned lateral protrusion, to thus provide sufficient strength to said connection means. Even more preferably, the afore-mentioned panel according to the invention is provided in a form wherein at least two pairs of corresponding opposite edges are provided, wherein said edges are provided with the afore-mentioned connection means.

In a preferred embodiment, the present invention provides a panel according to the second aspect of the invention, wherein said connection means have a thickness of at least 2.0 mm, and preferably at least 2.5 mm. More preferably, said connection means have a thickness of at least 3.0 mm, and still more preferably, said connection means have a maximum thickness of 6.0 mm and most preferably maximally 5.0 mm. Such thickness of the afore-mentioned connection means, optionally and preferably carried out additionally with the afore-mentioned reinforcement layer, usually provides a sufficiently qualitative bond between the constituting parts and, moreover, is generally sufficiently strong to withstand possible damage during transportation or construction of the mentioned floor or wall coverings.

Although the invention according to a preferred embodiment provides connection means along the edges of afore-mentioned panels, the skilled person in the technical field of floor and/or wall coverings will appreciate the fact that said panels can be implemented in the absence of said connection means. In such an embodiment, said panels are intended to be fixed on a subsurface, for example by means of gluing. The binder or the bonding ensures a further stabilisation of the dimensions of the panels. As an alternative to the afore-mentioned bonding, a fixative can also be used. Such fixative or fixing agent signifies an adhesive which is suitable to bind panels to a subsurface, yet can be removed in a simple manner and without causing damage to the subsurface. By stabilisation by one or more reinforcement layers, an effective gluing appears to be unnecessary. In such cases, said panels can be carried out with a total thickness of afore-mentioned substrate layer and afore-mentioned top layer situated between 1.0 mm and 5.0 mm and preferably situated between 1.5 mm and 4.0 mm. Most preferably, the afore-mentioned thickness is situated between 2.0 mm and 3.0 mm. In an analogous, yet separate embodiment, a panel according to the first aspect of the invention is provided with a thickness comprised between 4.0 mm and 10.0 mm, and more preferably between 6.0 mm and 8.0 mm. Such panels are usually used as so-called loose panels, or referred to by the English term as "loose-lays", by which is meant that no additional adhesive or fixative is used to fix the panels onto a subsurface. Nevertheless, one can opt to still apply such an adhesive.

In a more preferred embodiment, the afore-mentioned panels according to the second aspect of the invention are designed in a rectangular shape for providing panels or in an approximately square shape for providing tiles. In a first embodiment, said panels are designed in a rectangular shape with a length ranging between 0.5 m and 3.0 m, preferably between 0.9 m and 2.5 m, and more preferably between 0.9 m and 1.8 m; and with a width ranging between 5 cm and 25 cm, preferably between 7 cm and 25 cm, and most preferably between 15 cm and 25 cm. In an alternative embodiment, said tiles are designed in rectangular to approximately square shape with a side ranging between 10 cm and 100 cm, preferably between 15 cm and 75 cm, and more preferably between 20 cm and 60 cm. In a preferred embodiment, the present invention provides a panel according to the second aspect of the invention, wherein said back-pull layer and/or core layer are at least partially made of polyvinyl chloride.

In a preferred embodiment, the present invention provides a panel according to the second aspect of the invention, wherein said back-pull layer and/or core layer are at least partially made of polyvinyl chloride.

In a third aspect, the present invention provides a use of a process according to the first aspect of the invention, for manufacturing panels for floor or wall coverings.

The most preferred embodiment of a process and panel according to the invention is obtained by the suitable combination of several of the afore-mentioned aspects, which can be identified by a person skilled in the technical field of vinyl laminate panels for floor or wall coverings.

EXAMPLE

In what follows, the invention will be elucidated with reference to non-limiting example which illustrate the invention, and which are not intended to or should be interpreted to limit the scope of the invention.

Example 1

A dryblend is produced by mixing and homogenising pre-measured quantities of PVC, plasticizer, filler and additives. Thus, a dryblend with composition is obtained as shown in Table 1.

TABLE 1

Composition of dryblend for extruding a thermoplastic sheet.

|  | % by weight |
| --- | --- |
| PVC | 61.47 |
| Plasticizer | 27.04 |
| Filler | 9.22 |
| Additives | 2.27 |

Said dryblend is homogenised and thereby reaches a temperature of about 100° C. After possible storage in a buffer tank, said dryblend is fed to a co-rotating twin-screw extruder. By means of a lateral supply opening or "side feeder", filler is fed to the twin-screw extruder in a ratio of dryblend:filler of 37:63. The thus obtained thermoplastic melt is further mixed by means of the twin-screw extruder, and subsequently, by means of a melt pump, brought to a pressure of 160 bar, before being extruded through a die to a plate-shaped profile. In this, flow rates of up to 4000 kg per hour are easily achievable. The extruded profile comprises accordingly a filler content of 66% by weight, and is then impregnated onto a glass fibre fleece, thereby obtaining a first reinforced thermoplastic layer. In the subsequent steps, the obtained thermoplastic layer is laminated with a second thermoplastic layer comprising a decor layer, a print layer and a wear layer. Finally, the laminated plate is dimensioned at a well-defined length and width, thereby obtaining a panel for floor or wall coverings.

Example 2

In an analogous manner to example 1, a panel for floor or wall coverings is obtained by means of extrusion of a dryblend with composition according to Table 2, mixed with filler via a side feeder at a ratio dryblend:filler of 39:61. The extruded profile comprises a filler content of 66% by weight, and is then processed as indicated in Example 1.

TABLE 2

Composition of dryblend for extruding a thermoplastic sheet.

|  | % by weight |
|---|---|
| PVC | 79.68 |
| Plasticizer | 5.42 |
| Filler | 11.95 |
| Additives | 2.95 |

The invention claimed is:

1. A process for the production of a panel for floor or wall coverings comprising the steps of (i) mixing and homogenizing raw materials, thereby obtaining a dryblend, (ii) extruding said dryblend, thereby obtaining one or more thermoplastic layers, (iii) laminating the afore-mentioned thermoplastic layers, thereby obtaining a laminate, and (iv) profiling said laminate, thereby obtaining a panel for floor or wall coverings, wherein said dryblend, after homogenization, is stored in an insulated buffer tank and, by feeders, is fed to said twin-screw extruder at a temperature higher than 40° C., and wherein at least one thermoplastic layer is extruded by a co-rotating twin-screw extruder with pressure element.

2. Process according to claim 1, wherein at least one thermoplastic layer is extruded with a die wherein the die opening has a length and a width and wherein the ratio of the afore-mentioned length with respect to the afore-mentioned width is situated between 100:1 and 5000:1.

3. Process according to claim 1, wherein said pressure element provides a pressure of 50 bar to 250 bar.

4. Process according to claim 1, wherein said twin-screw extruder has a first and a second supply opening, wherein said second supply opening is provided at a distance from said first supply opening, and wherein along said second supply opening, a composition with a filler content is supplied, wherein said composition with a filler content has a different composition from the afore-mentioned dryblend and wherein preferably said composition with a filler content has a higher filler content compared to the afore-mentioned dryblend.

5. Process according to claim 4, wherein ratio between the filler content of said composition with a filler content and the filler content of the afore-mentioned dryblend is greater than 2:1.

6. Process according to claim 1, wherein one or more thermoplastic layers are provided with a reinforcement layer.

7. Process according to claim 6, wherein said reinforcement layer is impregnated with a thermoplastic at a temperature higher than 120° C.

8. Process according to claim 1, wherein at least one thermoplastic layer, after leaving said die, is cooled to a temperature higher than 75° C. and is laminated between a thermoplastic layer and a multifunctional layer comprising a wear layer, a print layer and a decor layer.

9. Process according to claim 1, wherein after laminating multiple thermoplastic layers, the upper layer is heated, and wherein a relief is applied onto said upper layer.

10. Process according to claim 1, wherein recycled material is mixed and homogenized with the afore-mentioned dryblend.

11. Panel for floor or wall coverings obtained by the process according to claim 1.

12. Panel according to claim 11, comprising a back-pull layer, a core layer, a decor layer or print layer, a wear layer, and optionally a coating layer.

13. Panel according to claim 11, wherein said back-pull layer and/or core layer are made of polyvinyl chloride.

14. Use of the process according to claim 1 for manufacturing panels for floor or wall coverings.

15. Process according to claim 9, wherein the upper layer is heated by infrared heating.

16. Process according to claim 1, wherein the process is used for manufacturing floor or wall coverings.

* * * * *